Jan. 3, 1928.

W. H. DOUGLAS 1,654,924

TRANSMISSION

Filed June 22, 1925    2 Sheets-Sheet 1

INVENTOR
William H. Douglas
BY

Patented Jan. 3, 1928.

1,654,924

UNITED STATES PATENT OFFICE.

WILLIAM H. DOUGLAS, OF KEYPORT, NEW JERSEY, ASSIGNOR, BY MESNE ASSIGNMENTS, TO HEALEY-AEROMARINE BUS COMPANY, INC., A CORPORATION OF NEW YORK.

TRANSMISSION.

Application filed June 22, 1925. Serial No. 38,757.

This invention relates to power transmission means such as those used in vehicles to drive the road wheels from the engine. These transmission systems commonly comprise a clutch, a change speed mechanism, a driven axle unit, with a universally jointed drive shaft connecting the axle and the change speed gear box. With the conventional disposition of these elements the clutch and transmission are interposed between the engine and the driven axle with the result that these two latter units must be disposed relatively far apart as occurs in rear driven vehicles with the engine conventionally placed at the front of the vehicle.

In other types as for instance in a front wheel drive, it is desirable to place the engine very close to the driven axle and this invention comprises a new disposition of the drivng elements to effect this close juxtaposition of the engine to the axle driving means.

In the preferred embodiment of Figure 1 the final drive comprises a driving gear secured to the gear box main shaft and a driven gear connected to the axle shafts; the axle gears chosen for illustration being of the worm type, but this invention is not limited to that particular form of final drive. In conformity with the prime object of this invention the engine is disposed close to the driven axle; in fact the engine flywheel is given only a bare clearance from the driven axle gear. Thus no room is afforded between the engine and the driving axle gear, (in this instance a worm) for the interposition of the clutch and change speed gear and accordingly in this invention these parts are disposed on the side of the axle gears remote from the engine and are connected thereto by a shaft passing through the worm and the gear box main shaft which are made hollow for this purpose.

The disposition of the engine and transmission parts on opposite sides of the final drive has been achieved in the prior art by disposing a drive shaft to one side of the worm or other final drive member and connecting to the transmission by gearing means, but with such disposition a direct drive on high gear cannot be obtained and the retention of such a direct drive is one of the objects of this invention.

Another object of this invention resides in the organization of the engine transmission clutch and final drive to comprise a simple compact unit which can readily be removed as such from the vehicle and which shall project for only a minimum distance either in front of or behind the driven axle.

The change speed gears themselves may be of any suitable type since they do not by themselves constitute an essential feature of this invention.

Various other objects and advantages of the invention will be in part obvious from an inspection of the accompanying drawings and a careful consideration of the following particular description and claims of one form of mechanism embodying my invention.

In the drawings:—

Figure 1:
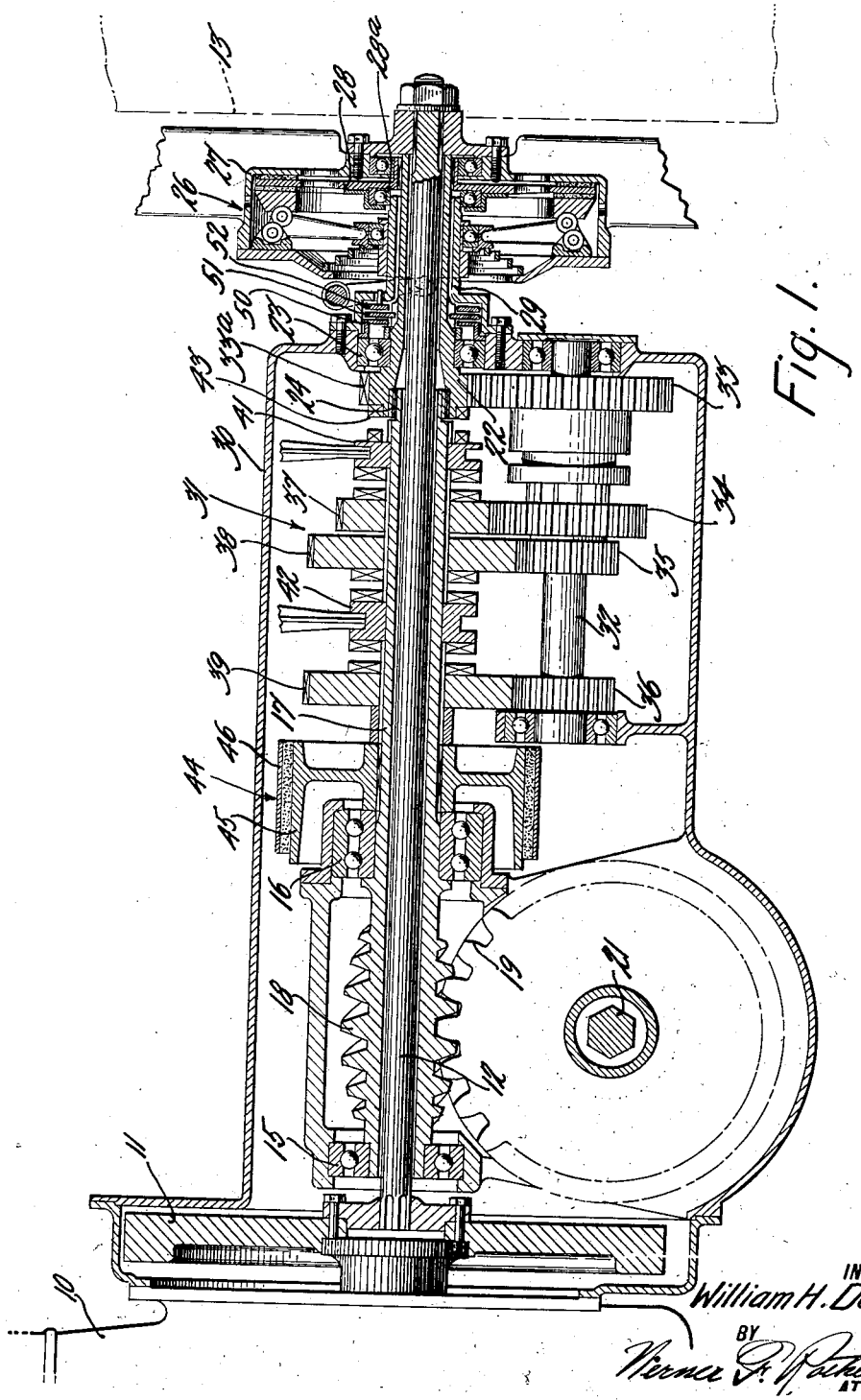
Figure 1 is a vertical longitudinal section of the preferred embodiment of the present invention.

In the present instance with reference to Figure 1, 10 designates a conventional internal combustion engine provided with a flywheel 11. To the flywheel 11 there is secured a drive shaft 12 extending forwardly towards the radiator 13.

Surrounding the drive shaft 12 and mounted for rotation in the bearings 15, 16 is a hollow worm shaft 17, said hollow shaft being provided with a worm 18 which meshes with a worm wheel 19 connected to the axle drive shaft 21.

A hollow clutch shaft 22 is mounted for rotation in the bearing 23 and supports the free end of the hollow shaft 17 by means of the roller bearing 24.

A clutch 26 more particularly described in the copending application of Chilton filed June 22, 1925, Ser. No. 38,775 and the manner of mounting same is made use of although the invention is not restricted to the particular form of clutch shown and described. In the present embodiment the clutch comprises a driving member 27 splined to the shaft 12, and a driven member 28 splined to the hollow shaft 22, said clutch being rotatably mounted on a bearing 28ª which is supported on a sleeve 29 rigidly secured to the gear box 30. The clutch as shown in Figure 1 overhangs the gear box which makes a clutch supporting bearing desirable, but a relatively clumsy construction would result if such a bearing were disposed beyond the clutch, since the bearing would then have to be supported on relatively long outriggers.

A bearing 28$^a$ is accordingly supported on the sleeve 29 which is rigidly secured to the gear box as shown. The clutch actuating mechanism surrounds this sleeve 29, whilst the drive shaft 12 and the clutch shaft 22 to the latter of which is secured the first transmission gear 33$^a$ pass through the sleeve 29. The sleeve is enlarged at its attachment to the gear box to accommodate a clutch brake also featured in the copending application which comprises a fixed disk 50, a floating disk 51 secured for rotation with the clutch shaft 22, and a non-rotating floating disk 52 adapted for actuation to cause a contact of the combined disks when the clutch drawing collar is actuated to its fullest extent.

A variable drive transmission 31 of conventional type is mounted within the gear box 30 and disposed between the clutch 26 and the worm 18, said transmission comprising the usual lay shaft 32 provided with gears 33, 34, 35, 36 of which the gear 33 is in constant mesh with the gear 33$^a$ preferably formed integral with the clutch shaft 22. The gears 34, 35, and 36 mesh with the gears 37, 38 and 39 which are rotatably mounted on the hollow shaft 17 and adapted to be engaged by the axially shiftable members 41, 42 which are splined on the shaft 17.

The hollow worm shaft 17 is adapted to be driven at engine speed from the clutch shaft 22 by the shifting of the member 41 into engagement with said clutch shaft by means of the splines 43 thereon.

A foot brake 44 adapted to be operated in the usual manner, comprises a rotating member 45 splined to the worm shaft 17 and frictionally engaged by a band 46.

The invention is not restricted to the particular form of transmission as herein illustrated, the type disclosed being employed merely as a matter of convenience.

It will be seen that the worm wheel 19 is disposed quite close to the flywheel 11 and that the drive is transmitted thereto from the engine in the following manner. The engine directly drives the shaft 12, the drive is transmitted through the clutch either directly to the hollow shaft 17 by means of the connection 43 or through the gear transmission at reduced speed, said shaft 17 transmitting the drive to the axle drive shaft 21 by means of the worm 18 and the worm wheel 19.

Figure 2:
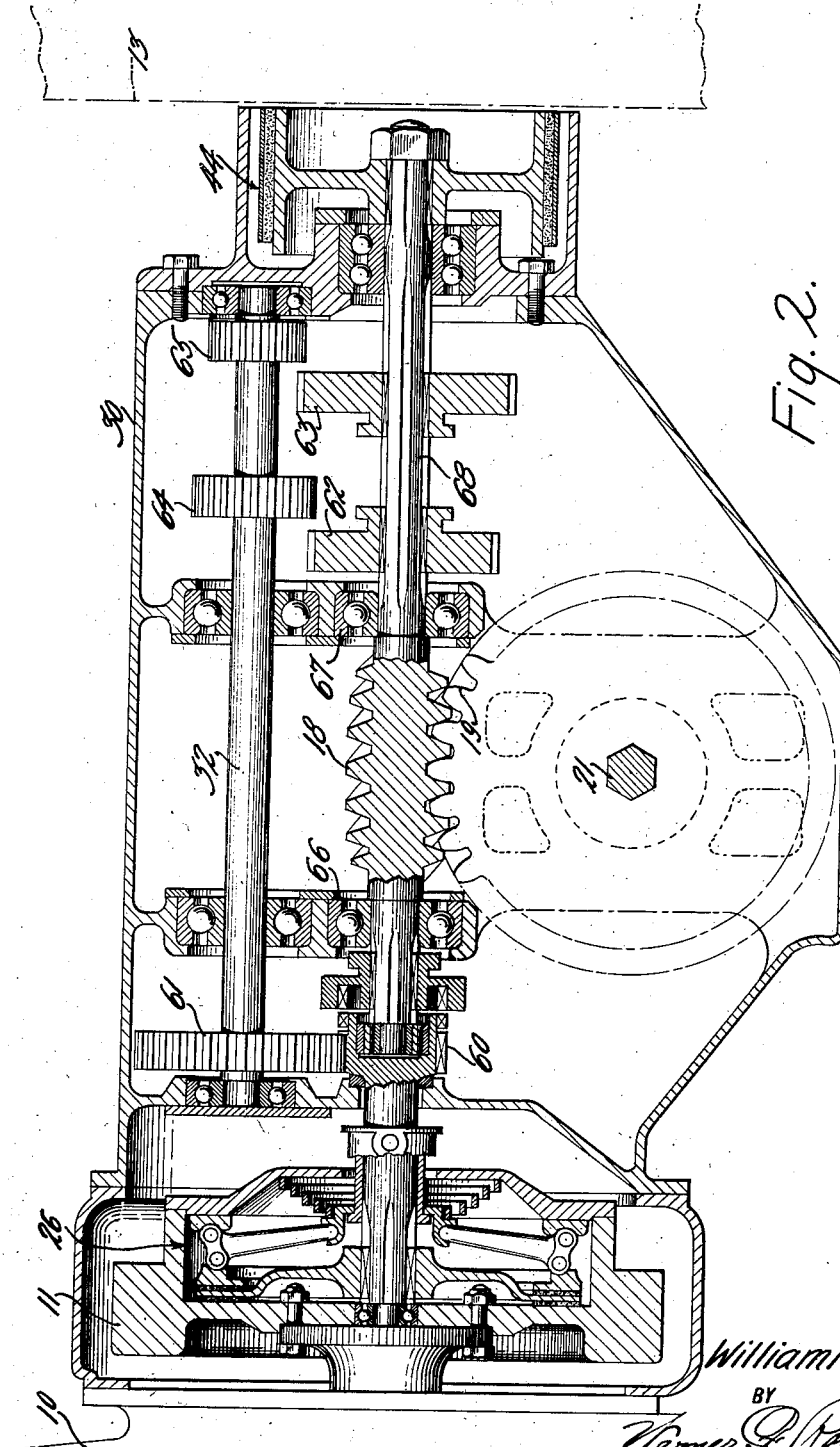
Figure 2 is a vertical longitudinal section of an alternative structure on a slightly larger scale than Figure 1.

In Figure 2 an alternative disposition of the parts is illustrated wherein the objects of this invention are achieved without resource to a hollow final drive shaft, but in this case the compactness is not quite so great as in the preferred embodiment of Figure 1. Accordingly, in Figure 2 the clutch 26 is in the conventional place in the engine flywheel 11 with only the constant mesh transmission gears 60 and 61 adjacent the clutch. The rest of the transmission gears, 62, 63, 64, 65 are spaced axially away from the constant mesh gears sufficiently to permit the worm 18 to be disposed between the bearings 66, 67. It will be appreciated that the greater part of the length of the usual change speed transmissions is occupied by the slidable gears 63, 62, the constant mesh gears 60, 61 occupying only a relatively small part of the length. In this particular embodiment the latter gears only are interposed between the engine and the final drive thus saving the relatively great length occupied by the sliding gears. The drive shaft 68 extends through the gear box 30 and is provided at its extremity with a brake 44.

Variations may be resorted to within the scope of the invention and portions of the improvements may be used without the others, whilst not departing from the spirit of the invention.

Having thus described my invention, I claim:

1. In a vehicle driving system including an engine, the combination of a final axle drive, a clutch, and a sliding gear transmission the sliding gears of which are disposed on the side of the final drive opposite to the engine for the purpose of minimizing the distance between the engine and the axle drive, said clutch having a direct shaft connecting the same with the engine, and means in said transmission adapted to directly connect the clutch with the final axle drive for unitary rotation.

2. In a front wheel drive, the combination with an engine having a shaft, of a transverse wheel driving shaft disposed adjacent thereto, a clutch, a hollow shaft geared to the transverse shaft, and a change speed gear transmission having gear shift means disposed on the side of the wheel shaft remote from the engine; one of the gears in said transmission adapted to establish a direct driving connection between the clutch and the hollow shaft.

3. In apparatus of the class described, the combination with an engine having a drive shaft, of an extension shaft, a transverse driven wheel shaft disposed adjacent the engine, a separable clutch having an element drivably mounted at the end of the extension shaft remote from the engine, a shaft geared to drive the wheel shaft and disposed around the extension shaft, a change speed transmission adapted to drive said geared shaft either directly or at reduced speed from said clutch.

4. In apparatus of the class described, the combination with a transmission having aligned driving and driven gear shafts and adapted for direct or geared driving connection therebetween, of a power shaft passing through said gear shafts, a clutch connection between said power shaft and said driving gear shaft, a driven means including a transverse wheel driving shaft geared to the driven gear shaft; said power shaft adapted to engage a power means disposed adjacent said driven means and on the opposite side thereof to the clutch and transmission.

5. In apparatus of the class described, the combination with an engine, of a gear casing, a shaft driven from the engine and extending through said casing, a clutch rotationally mounted on the exterior of the casing, and drivably connected to said shaft, a transverse wheel driving shaft disposed between the clutch and the engine, a hollow shaft geared to drive the wheel shaft and surrounding the first said shaft, a further hollow shaft secured to the clutch and adapted for connection with the first said hollow shaft, a change speed gear transmission disposed between the clutch and the wheel shaft, said geared shaft adapted to be driven from the second said hollow shaft at engine speed or at reduced speed through said transmission.

6. In apparatus of the class described the combination with an engine, of a drive shaft, a transverse wheel driving shaft disposed adjacent the engine, a clutch having a driving and a driven element, said clutch disposed on the side of the wheel shaft remote from the engine, a shaft concentric with the extension shaft and geared to drive the wheel shaft, a change speed gear transmission driven from the clutch and disposed between the clutch and the wheel shaft, said geared shaft adapted to be drivably connected to the clutch either directly or through said transmission.

7. In a front wheel driven vehicle, the combination with an engine, of a casing, a transverse wheel driving shaft extending from the casing, a gear on said shaft, a hollow drive shaft rotatably supported in the casing and having an element meshing with said gear, a clutch rotatably supported on the exterior of the casing, a drive shaft coupled to said engine and extending through the hollow shaft to drive the clutch, a change speed transmission driven from the clutch and disposed between the clutch and the wheel shaft, the whole organized to drive said hollow drive shaft at engine speed from the clutch and at reduced speed through said transmission.

Signed at Keyport, in the county of Monmouth, and State of New Jersey, this 19th day of June, A. D. 1925.

WM. H. DOUGLAS.